MEANS FOR FEEDING FIBER TO A PILE FABRIC KNITTING MACHINE

Original Filed Dec. 10, 1962 5 Sheets-Sheet 1

INVENTOR.
OTTO T. RADTKE
BY
Barnes, Kisselle, Raisch & Choate
ATTORNEYS

MEANS FOR FEEDING FIBER TO A PILE FABRIC KNITTING MACHINE

Original Filed Dec. 10, 1962 5 Sheets-Sheet 2

INVENTOR.
OTTO T. RADTKE
BY
Barnes, Kisselle, Raisch & Choate
ATTORNEYS

MEANS FOR FEEDING FIBER TO A PILE FABRIC KNITTING MACHINE

Original Filed Dec. 10, 1962 5 Sheets-Sheet 7

INVENTOR.
OTTO T. RADTKE
BY
Barnes, Kisselle, Raisch & Choate
ATTORNEYS

MEANS FOR FEEDING FIBER TO A PILE FABRIC KNITTING MACHINE

Original Filed Dec. 10, 1962 5 Sheets-Sheet 4

INVENTOR.
OTTO T. RADTKE
BY
Barnes, Kisselle, Raisch & Choate
ATTORNEYS

MEANS FOR FEEDING FIBER TO A PILE FABRIC KNITTING MACHINE

Original Filed Dec. 10, 1962 5 Sheets-Sheet 5

INVENTOR.
OTTO T. RADTKE
BY
Barnes, Kisselle, Raisch & Choate
ATTORNEYS

United States Patent Office

Re. 26,015
Reissued May 3, 1966

26,015

MEANS FOR FEEDING FIBER TO A PILE FABRIC KNITTING MACHINE

Otto T. Radtke, Walworth, Wis., assignor to Glenoit Mills, Inc., Tarboro, N.C., a corporation of Delaware Original No. 3,188,834, dated June 15, 1965, Ser. No. 247,430, Dec. 10, 1962. Application for reissue Oct. 26, 1965, Ser. No. 507,263
5 Claims. (Cl. 66—9)

Matter enclosed in heavy brackets [ ] appears in the original patent but forms no part of this reissue specification; matter printed in italics indicates the additions made by reissue.

This application is a continuation-in-part of my prior copending application Serial No. 846,506, filed October 14, 1959, and now abandoned.

This invention relates to a pile fabric knitting machine and more particularly to a method and means for feeding fibers from roving or sliver to the needles of a pile fabric knitting machine.

Pile fabric knitting machines of the type comprising a circular knitting machine for knitting the back or base fabric and a carding head for carding and feeding the pile forming fibrous material to the needles of the machine are well known. See, for example, Brandt 2,710,-525 and Moore 1,848,370.

The present invention comprises a fiber feeding apparatus for pile fabric knitting machines designed to produce both a carding action and a drafting action on the fibers being fed and is designated herein broadly as a carding unit.

It is an object of this invention to produce a new and improved apparatus for feeding pile forming fibrous material to the needles of a pile fabric knitting machine which is more efficient, economical and practical than carding heads known heretofore.

This invention contemplates a carding unit which will feed, parallelize and impart a uniform distribution to smaller denier fibers than known carding heads and which will handle coarse and fine denier blends of fibers without separation of the coarse and fine fibers.

It is also an object of this invention to produce a carding unit which will produce more uniform distribution of fibers on the needles of the knitting machine and in the pile fabric produced thereby.

This invention also contemplates a carding unit which is simpler and which requires less service than carding heads heretofore known.

This invention also contemplates a carding unit capable of handling heavier roving or sliver and longer fiber than is practicable with carding heads known heretofore.

Figure 1:
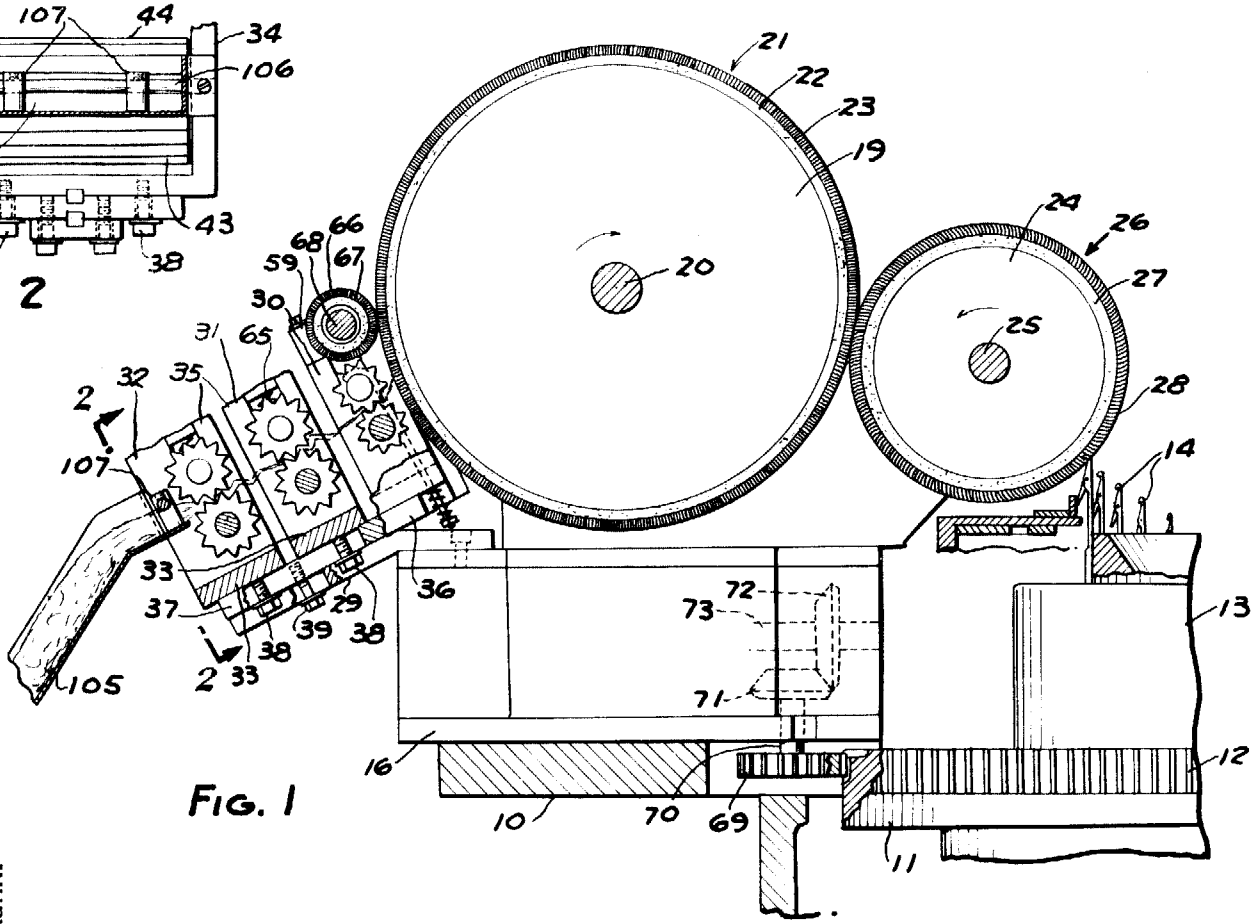
FIG. 1 is a vertical section through the carding unit of this invention and the knitting machine showing portions of the needle cylinder, needles, and the frame of the knitting machine.
Figure 2:
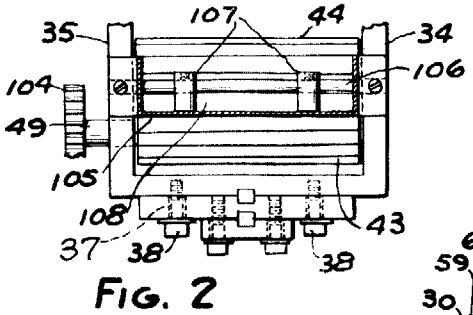
FIG. 2 is a section along the line 2—2 of FIG. 1.

Referring to FIG. 1, the so-called head ring, which is an annular ring forming part of the frame of the circular knitting machine, is designated 10. This ring is supported above the floor by other parts of the frame (not shown) and in turn supports the gear ring 11 which is rotatable in a manner well known in the art. The teeth of the gear ring are designated 12. The needle cylinder is designated 13 and is supported on the gear ring 11 to which it is secured by screws (not shown). The cylinder carries a circular row of latch needles 14, only a few of which are shown. Since circular knitting machines for knitting pile fabric are well known, it is believed that no further description or showing of the knitting machine is necessary.

The carding unit of this invention consists of a frame generally designated 15 which comprises a base 16, an upstanding left side 17 and an upstanding right side 18. The base 16 is bolted or otherwise secured to the frame of the knitting machine. The main cylinder or transfer roll 19 of the carding unit is fixed upon shaft 20 which is journalled in the side walls 17 and 18 of frame 15.

Cylinder 19 is covered with a conventional card clothing generally designated 21 which comprises the usual cotton backing and felt body 22 and wire teeth 23. A conventional doffer roll 24 is fixed upon shaft 25 which is also journalled at each end in the side walls of the frame 15. The doffer roll also is covered with a conventional card clothing generally designated 26 and comprising the usual cotton backing and felt body 27 and wire teeth 28. The teeth 23 of the transfer roll 19 intermesh with teeth 28 of the doffer roll 24.

The drawing or drafting section of the carding unit comprises three pairs or sets of corrugated or fluted rollers 40, 41 and 42. The corrugated roller portion of the unit is supported upon a bracket 29 which is bolted to base 16. Rollers 42 are mounted in a U-frame 30. Rollers 41 are mounted in a U-frame 31. Rollers 40 are mounted in a U-frame 32. Frames 31 and 32 each comprise a base 33 and right and left hand side walls 34 and 35. Frames 31, 32 are adjustably mounted upon plate 36. Frame 30 is preferably fixed on plate 36. Frames 31 and 32 are secured in position by bolts 38 which project through slots 37 in plate 36 and screw into bases 33. When bolts 38 are turned up against plate 36, frames 31, 32 are locked in position on plate 36. The frames 30, 31 and 32 each support a pair of corrugating rollers. Plate 36 is adjustable upon bracket 29 toward and away from the cylinder 19 and is locked in position by bolts 39 which project through parallel slots in bracket 29. Bolts 39 screw into plate 36 and when turned tightly up against bracket 29, lock plate 36 in adjusted position upon bracket 29.

Figure 7:
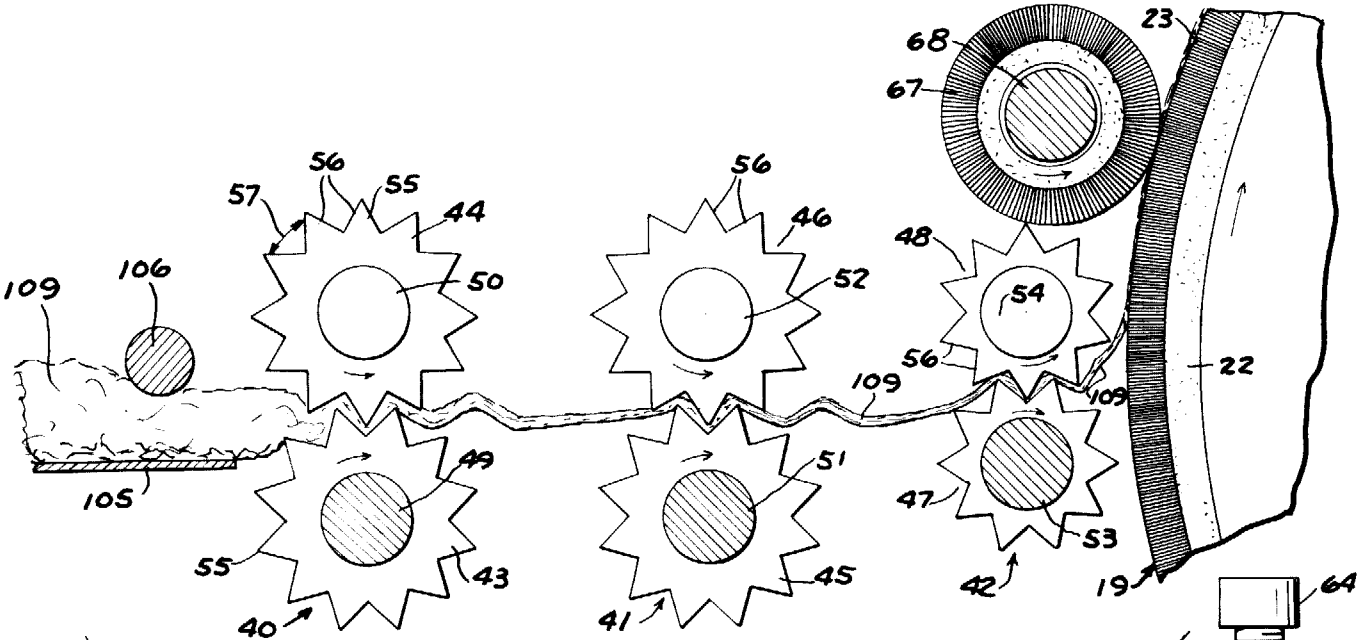
FIG. 7 is a fragmentary side elevation of the carding unit showing the three pairs of corrugating rollers, the wire brush roller and the transfer roll.

Since each pair of corrugated rollers 40, 41 and 42 is rotatably supported in its respective support in the same manner, the description of the mounting of one pair will apply equally well to the rotatable supporting of the other pairs. Referring to FIG. 7, the first pair of corrugated rollers is designated 40, the second pair 41 and the third pair 42. Each pair comprises a lower roller and an upper roller. The lower and upper rollers of pair 40 are designated 43 and 44, respectively. The lower and upper rollers of pair 41 are designated 45 and 46, respectively, and the lower and upper rollers of pair 42 are designated 47 and 48, respectively. Rollers 43, 44, 45 and 46 are substantially identical and can be used interchangeably. Rollers 47 and 48 are substantial copies of rollers 43 to 46 except that they have a somewhat smaller outside diameter, for example, rollers 43 to 46 may each have an outside diameter of one and a quarter inches whereas rollers 47 and 48 may each have an outside diameter of one inch.

Corrugated rollers 43 and 44 are fixed upon shafts 49 and 50, rollers 45 and 46 are fixed upon shafts 51 and 52, and rollers 47 and 48 are fixed upon shafts 53 and 54, respectively. Shafts 49 and 50 are journalled at each end in the side walls 34, 35 of their support frame 32. Shafts 51 and 52 are journalled at each end in the side walls 34, 35 of support frame 31. Shafts 53 and 54 are journalled at each end in the side walls of their support frame 30.

Each of the rollers 43 to 48, inclusive, is provided with longitudinal corrugations extending parallel to its axis of rotation. These corrugations are designated 55. The corrugations or longitudinal teeth 55 of the upper and lower rollers of each pair of rollers are in mesh. The side faces of the corrugations are designated 56. The angle 57 included between the side faces 56 of each two successive roller teeth 55 preferably should range between 60° to 90°. To state it another way, the sides 56 of each groove made by each two succeeding teeth should have an included angle falling within a range of from 60° to 90°. The preferred included angel of the side faces of each groove is about 60°.

The upper corrugated rollers 44, 46 and 48 are each mounted in intermeshing relation with their respective bottom corrugated roller 43, 45 and 47 with a pressure that can be varied. Bottom rollers 43, 45 and 47 drive upper rollers 44, 46 and 48, respectively.

Figure 3:
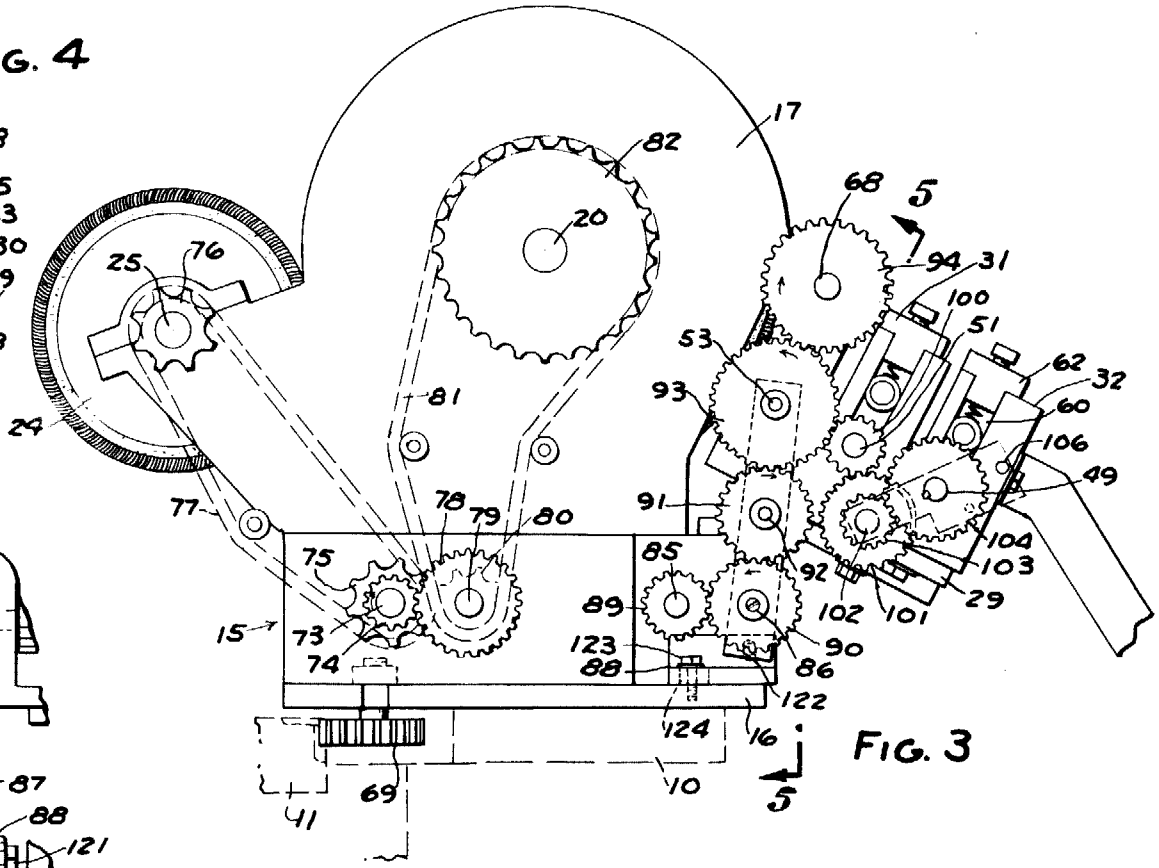
FIG. 3 is a side elevation of the carding unit showing in particular the driving gearing. This view is taken from the left hand side of the unit.
Figure 4:
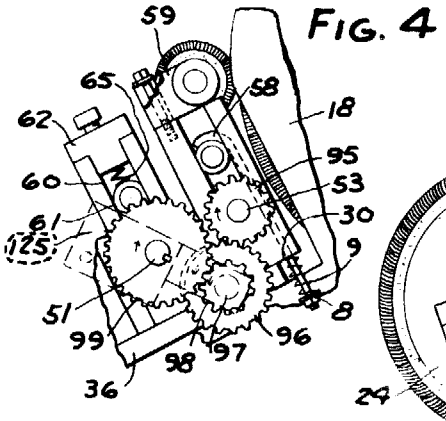
FIG. 4 is a fragmentary view of the unit taken on the right hand side and showing the support for part of the driving gearing which is located on the right hand side of the unit.
Figure 6:
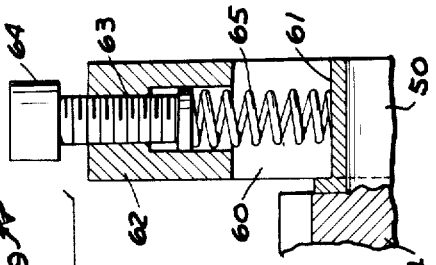
FIG. 6 is a detail section of one of the spring mechanisms for adjusting the pressure of the upper corrugated roller against the lower corrugated roller.

Preferably, the intermeshing pressure of each pair of rollers is controlled by a pair of springs, one at each end of the shaft which supports each of the upper corrugated rollers. The mounting of each end of the shaft of each of the upper rollers is shown in FIGS. 3, 4 and 6. As shown, each of the side walls of frames 31, 32 and 30 are provided with vertical slots 60. The bottom of each slot 60 is located a short distance on the order of one-quarter (¼) of an inch above the top of the bearings which support the shafts 49, 51 and 53 for the lower corrugated rollers. The ends of shafts 50, 52 and 54 are supported in bushings 61 which fit snugly in slots 60. The upper end of each slot 60 in frames 31 and 32 is closed by a cap 62. The upper end of slot 60 in frame 30 is closed by a cap 59. Each cap 62 is provided with a threaded bore 63 which receives an adjusting screw 64, the lower end of which bears upon a coil spring 65 located in slot 60 between bushing 61 and the lower end of adjusting screw 64. Each bushing 61 is positioned above or has a clearance of the order of one-eighth (⅛) of an inch or more with the bottom of slot 60 when the upper corrugated rollers are resting upon, and in mesh with, the lowermost rollers.

Springs 65, the tension of which can be adjusted by screws 64, to determine the intermeshing of clamping pressure of the upper and lower rollers so that when the roving is fed through these corrugated rollers the upper roller can move upwardly with respect to the lower roller to an extent depending upon the pressure of springs 65. Upper roller 48 is held yieldably intermeshed with lower roller 47 by two J-clamps 58. Clamps 58 engage the ends of shaft 54 and extend downwardly through the base of frame 30. A compression spring 9 is passed over the end of each J-clamp 58 and a nut 8 threaded on the end of each clamp 58 is turned upwardldy so as to compress the spring against the bottom of frame 30 and thereby cause clamps 58 to draw the upper roller 48 downwardly against lower roller 47. The compression of springs 65 for one upper roller 44 preferably will be adjusted to a different degree than the compression springs 65, 9 for rollers 46 and 48. Preferably, the pressure applied by springs 65 upon roller 44 will be less than that applied by springs 65 upon intermediate roller 46 and the pressure applied by springs 65 upon roller 46 will be less than that applied by the corresponding springs on roller 48.

Figure 13:
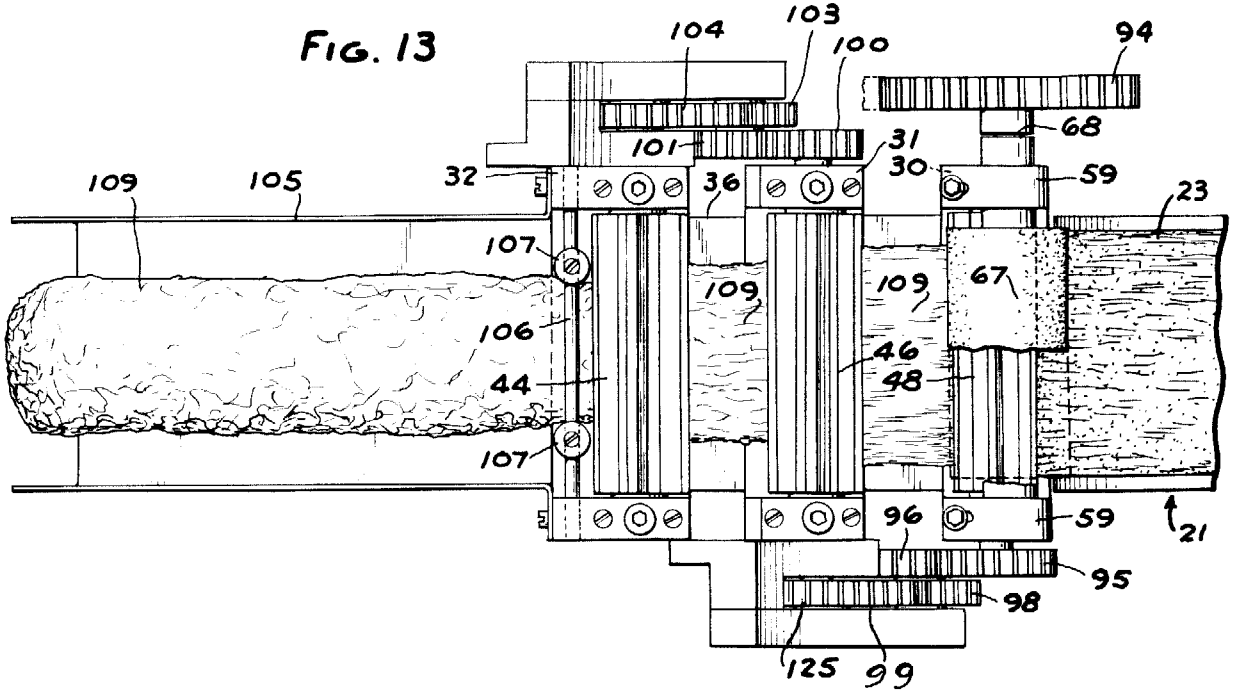
FIG. 13 is a top plan view of the carding unit.

A rotary brush 66 having pig bristles or synthetic bristles 67 is fixed on shaft 68 which is journalled at each end in caps 59. Rotary brush 66 is positioned so that the bristles 67 have a zero clearance or just touch not only the wires 23 of transfer roll 19 but also the apices of the teeth of the upper roller 48. By this arrangement, rotary brush 66 prevents wrapping of sliver fibers around the upper roll 48, and aids in the delivery of the flattened and attenuated sliver to the teeth 23 of transfer roll 19. More specifically, the centrifugal force generated by the rotation of transfer roll 19 tends to cause the sliver to migrate outwardly, away from the teeth 23. Brush 66 is designed to prevent such migration, and ensure that teeth 23 of transfer roll 19 catch and retain the sliver fibers. Rotary brush 66 is adjustable by any suitable means so as to maintain its bristles 67 contiguous at all times to the upper feed roll 48 and to the wire teeth 23 of transfer roll 19. For example, caps 59 may be provided with slots and adjusting screws (see FIG. 13) whereby the caps, and hence rotary brush 66, may be adjusted relative to U-frame 30, whereby the contiguous relation aforesaid may be maintained.

The carding unit is driven from the ring gear 11. The drive for ring gear 11 is not shown but is conventional and usually consists of an electric motor which is geared to the ring gear 11. The power for driving the carding unit is taken from driving ring gear 11 by means of a pinion or gear 69 which meshes with teeth 12 of ring gear 11. Gear 69 is fixed at the lower end of a shaft 70 which is journalled in the base 16 of frame 15. Bevel gear 71 is fixed to the upper end of shaft 70 and meshes with a bevel gear 72 fixed on horizontal drive shaft 73 journalled in frame 15.

Gear 74 and sprocket 75 are fixed on the end of shaft 120 which is journalled in frame 15. Doffer roll 24 is driven by means of a sprocket 76 fixed on shaft 25 and connected by a driving chain 77 with sprocket 75. Small gear 74 is driven by a large gear 78 fixed on the end of shaft 79 which is also journalled in frame 15. Also fixed upon shaft 79 is a sprocket 80. Shaft 79 is driven from shaft 73 by means of bevel gear 110 fixed on the end of shaft 79 which meshes with bevel gear 111 fixed on shaft 73. Sprocket 80 is connected by means of a chain 81 in driving relation with a sprocket 82 fixed on shaft 20. Shaft 20 supports the transfer roll or main cylinder 19.

Figure 5:
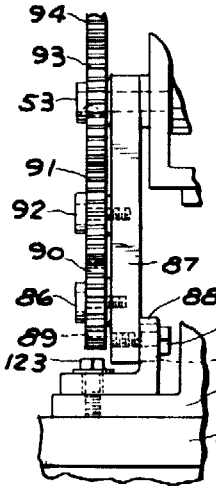
FIG. 5 is a fragmentary view of the carding unit taken along the line 5—5 of FIG. 3.

Shaft 85 is journalled in frame 15. Gear 89 is fixed on one end of shaft 85 and bevel gear 83 is fixed on the other end of shaft 85 and meshes with bevel gear 84 fixed on driving shaft 73. Thus, shaft 73 acts through intermeshed gears 83 and 84 to drive shaft 85 and gear 89. A link 87 is supported at one end upon shaft 53. The lower end of this link is connected to bracket 88 which is bolted to base 16 of frame 15, FIGS. 3 and 5. Intermeshed gears 90 and 91 are mounted upon stub shafts 86 and 92, respectively, which are supported upon link 87. Gear 93 is fixed on the left hand end of shaft 53. Shaft 53 supports lower corrugated roller 47. Gear 93 meshes with gear 94 which is fixed on shaft 68. Shaft 68 supports roller brush 66.

Gears 90 and 91 are mounted on link 87 which is pivotally supported on shaft 53. Thus, the corrugated roller assembly as a whole may be adjusted toward and away from transfer roller 19 by adjusting plate 36 relative to bracket 29 as above described, and the mounting of gears 90 and 91 on pivoted link 87 will permit this adjustment and yet retain gear 91 always in mesh with gear 93 and gear 90 always in mesh with gear 89. Whenever the feed roll assembly as a whole is adjusted toward or away from transfer cylinder 19, rotary brush 66 is adjusted, by means of the slots and adjusting screws in caps 59 aforesaid, to maintain the bristles 67 of the brush contiguous with both the feed roll 48 and the wire teeth of the transfer roll 19. The lower end of link 87 is connected to bracket 88 by bolt 121 which passes through an elongated slot 122 in bracket 88 so that the bolt 121 can be adjusted upwardly and downwardly in slot 122 as the roller assembly is adjusted toward or away from the transfer roll 19. Bracket 88 is secured to the base 16 by a bolt 123 which also passes through an elongated slot in bracket 88 to permit adjustment of bracket 88 along base 16.

In FIG. 3, the left hand end of shaft 53 is shown. Now, referring to FIG. 4, the right hand end of shaft 53 is shown. A gear 95 is fixed on the right hand end of shaft 53. This gear 95 meshes with gear 96 fixed on stub shaft 97 which is journalled in bracket 125 which is bolted to frame 31. Stub shaft 97 also has gear 98 fixed thereon which meshes with gear 99 which is fixed on the right hand end of shaft 51 which carries the intermediate lower roller 45. Now, referring to FIG. 3, gear 100 is fixed on the left hand end of shaft 51. (Referring to FIG. 3, gear 100 is offset from gear 93 and gears 100 and 93 therefore do not mesh but clear each other.) Gear 100 meshes with gear 101 rotatably mounted on stub shaft 102. Gear 103 fixed to gear 101 meshes with gear 104 which is fixed on the left hand end of shaft 40 upon which corrugated roller 43 is supported.

The gears in the gear train which drive shaft 53 and roller 47 are as follows: 69, 71, 72, 84, 83, 89, 90, 91, 93.

Gear 94, which rotates brush 66, meshes with gear 93.

The gear train which drives lower corrugated roller 45 includes all of the gears mentioned above for driving shaft 53 and roller 47 and, in addition, includes gears 95, 96, 98 and 99.

The gears of the gear train which drive corrugated roller 43 include all of the gears mentioned above in the driving gear train for corrugated roller 45 and, in addition, include gears 100, 101, 103 and 104 which is fixed on shaft 49.

By referring to the reduction gear trains which drive the three pairs of corrugated rollers, it should be noted that rollers 47 and 48 rotate at a faster speed than rollers 45 and 46 and that rollers 45 and 46 rotate at a faster speed than rollers 43 and 44. By way of example, gears 47 and 48 make two and one-half revolutions to each revolution of gears 45 and 46 and gears 45 and 46 make three revolutions to each revolution of gears 43 and 44. The r.p.m. ratio of rollers 42 to rollers 41 to two and one-half to one and the r.p.m. ratio of rollers 41 to rollers 40 is three to one. The purpose of these differences in r.p.m. of the three pairs of rollers is explained below.

A feed trough or channel 105 for the roving or sliver is secured by screws to frame 32. There is provided adjacent the outlet end of trough 105 a cross rod 106 upon which are adjustably mounted two posts 107. The posts 107 are adjusted lengthwise of rod 106 and held in position by set screws. The posts 107 in conjunction with rod 106 and the base of trough 105 form an outlet 108 through which the roving is fed into the first set of corrugated rollers 43 and 44. The width of the outlet 108 will depend upon the distance between posts 107 and will vary with the size of the roving being fed into the carding head.

The roving or sliver is designated 109 (FIG. 7) and may consist of any fibers or mixture of fibers, either natural or synthetic, coarse or fine or mixtures thereof, which are suitable for forming the pile of a knit pile fabric. By way of example, it is common practice to form the pile in knit pile fabrics of such well known fibers as wool, dynel, Orlon, Acrylan, nylon, Verel, and mixtures thereof, said pile fibers having known deniers. It is common practice in pile fabric to make the pile of fibers having deniers ranging from two to fifty, but reference is made to the denier of the pile fibers only by way of example because my carding head will operate efficiently regardless of the denier of the pile fiber.

The operation of the carding unit it as follows: The driving ring gear 11 drives the doffer roll 24, main transfer cylinder 19, brush 66 and corrugated rollers in the manner outlined above. The leading end of the roving or sliver 109 which is guided in trough 105, is passed through the outlet 108 and fed into the first set of rolls 43 and 44 which rotate in the direction of the arrows. As the roving passes or is drawn between the intermeshed teeth or corrugations 55 of the first pair of rollers, it is compressed and flattened out. The roving travels or is drawn from left to right, FIG. 7. The flattened end of the roving then passes into the second set of rollers 45 and 46 where the intermeshed corrugations apply pressure upon the roving. Since the second pair of rollers 45, 46 are rotating at a higher r.p.m. than the first set of rollers, the roving is attenuated, thinned or drawn out. The roving passes from the second set of rollers to the third set of rollers 47 and 48 which also hold or grip the roving in compression and the roving is further attenuated because rollers 47 and 48 are traveling at a higher r.p.m. than the second set of rollers 45, 46. The roving which has now been further attenuated and the fibers spread out into a flat sheet or layer of uniform thickness, is directed toward and substantially uniformly deposited across the wires of main cylinder 19 which carries the fibers clockwise, FIG. 1, to the doffer roll 24. Cylinder 19 actually serves principally as a transfer roll for the fibers. The doffer roll 24 picks the fibers from the wires of the transfer cylinder 19 and carries them around to the needles 14 in the rotating needle cylinder 13 and the needles pick the fibers from the doffer roll in the well known manner. Since brush 66 has a zero clearance both with roll 48 and with the circumference or tips of the wires 23 of the transfer roll 19, the brush picks off any stray fibers from roller 48 and also aids in uniformly distributing the fibers over the transfer roll 19. With the aid of brush 67, the drafting action of the three sets of rollers 40, 41 and 42 delivers a continuous, uniform layer of fibers on transfer roll 19. Rolls 19 and 24 serve primarily to transfer the attenuated and parallelized fibers from rolls 47, 48 to the needles 14.

The clearance between roller 48 and the transfer roller 19 varies with the fiber length. This clearance can range from one-quarter of an inch to one-two hundredths of an inch.

Figure 9:
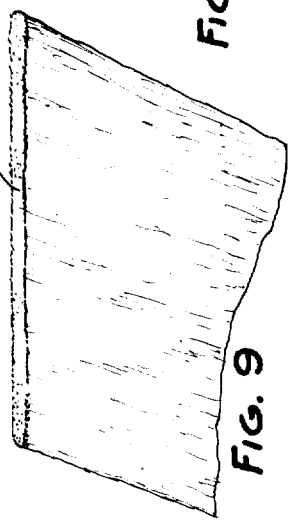
FIG. 9 is a fragmentary elevation of the roving after it has passed through the carding unit of this invention.
Figure 8:
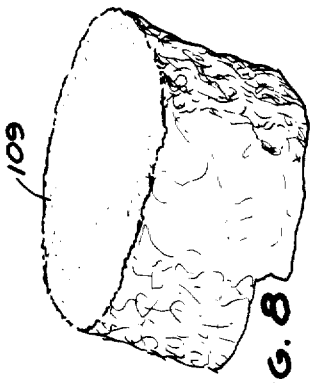
FIG. 8 illustrates the roving or sliver before it is carded by the unit of this invention.
Figure 10:
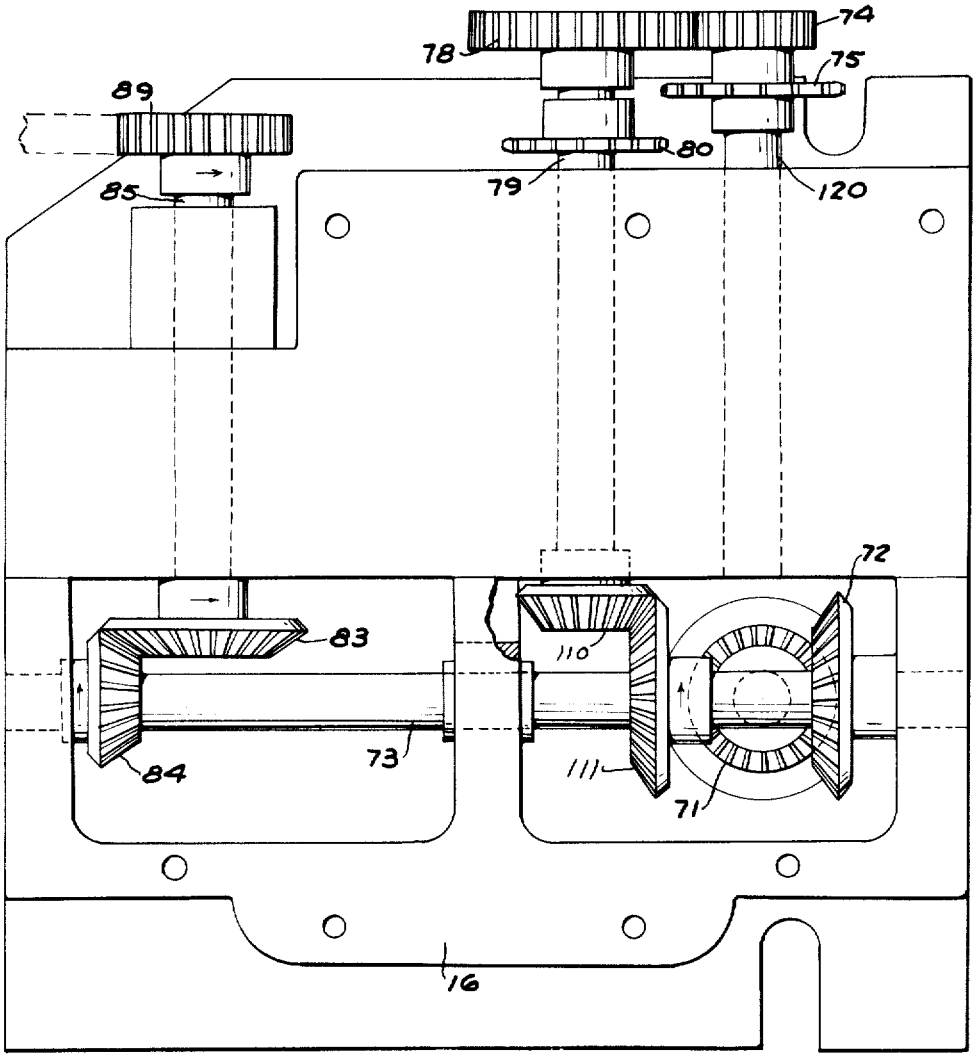
FIG. 10 is a plan view of the gear box with the cover removed.
Figure 11:
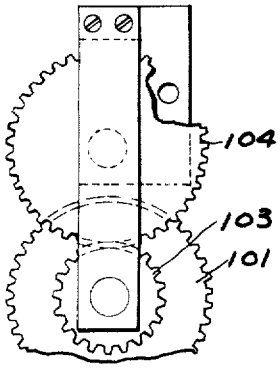
FIGS. 11 and 12 are front and side views respectively of the reduction gear drive unit for the corrugating rollers.
Figure 12:
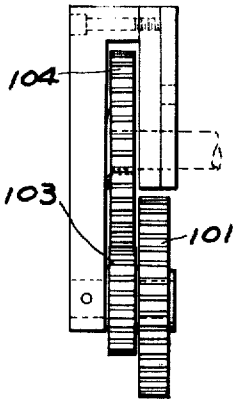

Shaft 50 is vertically aligned with shaft 49 and similarly shafts 52 and 54 are vertically aligned with shafts 51 and 53. The distance between the centers of shafts 49 and 51 and shafts 51 and 53 is always greater than the length of the fibers which make up the roving 109 which is being drafted, carded and fed in my carding unit. Hence, the desirability for having the pairs of corrugated rollers 40, 41 and 42 adjustably mounted upon plate 36. Unless the distance between the centers of roller shafts 49 and 51 and between shafts 51 and 53 is greater than the length of the fibers, then the fibers will be stretched because rollers 45 and 46 rotate at a greater speed than rollers 43 and 44 and rollers 47 and 48 rotate at a greater speed than rollers 45 and 46. Stretching of the fibers is undesirable because it causes them to lose life. Thus, in the roller assembly, the distance between the line along which one set of corrugated rollers clamps or compresses the roving to the point or line where the next set of rollers press or clamp the roving is always greater than the length of the fibers which constitute the roving. Hence, in passing through the roller assembly, the individual fibers are never stretched but the roving is attenuated or lengthened so that the fibers move relative to each other lenghwise of the roving and line up parallel to the length of the roving and to become uniformly distributed across the width of the roving, see FIG. 9 which illustrates the attenuated roving as it passes out of corrugated rollers 42 preparatory to being taken up by the transfer roll 19. Rollers 40, 41 and 42 crimp the fibers. This crimp is temporary and aids or allows the transfer and doffer rollers to properly handle the fibers. The crimp helps the main transfer cylinder and doffer roll to better grip and hold the fibers so that they will not fly off these rollers during operation due to centrifugal force. The crimp also aids the needles in raking the fibers out of the doffer roll which gives more uniform distribution of the fibers on the needles and in the fabric.

The corrugations or flutes can be rounded off so as not to crimp in those instances where the roving constitutes pre-crimped fibers. My carding unit will handle smaller denier fibers than conventional carding heads. Conventional carding heads use wire carding cloth. This carding cloth wears out rapidly in the use of a carding head. Since my carding unit uses corrugated rollers instead of wire carding cloth, the expense incident to the wearing out of carding cloth in the conventional carding head is avoided in the use of my carding unit. Further, my carding unit will handle a roving made of a mixture or blend of coarse and fine denier fibers without separating the coarse and fine denier fibers. A conventional carding head will separate the coarse from the fine denier fibers to a substantial extent and therefore will fail to maintain the coarse and fine denier blend desired.

My carding unit will handle heavier roving or sliver than conventional carding heads because the roller assembly takes the roving or sliver and spreads it out into a wide uniform layer before it is picked up by the card cloth of the transfer roll 19. This is a highly important advantage, for in all prior carding heads for pile fabric knitting machines it is necessary to extensively pre-card the sliver into a relatively fine roving preparatory to knitting. With this invention, pre-carding of the sliver is substantially reduced, since the plural pairs of feed rolls permit handling of substantially heavier sliver than heretofore was possible.

Likewise, since the fibers are applied to only two rolls having an outer surface of card cloth, my carding unit is admirably suited for handling much longer fibers than can be efficiently fed on a conventional card head.

This carding unit is efficient in operation and accomplishes in a practical manner the uniform distribution and feeding of the fibers onto transfer roll 19 and the doffer roll 24. Uniform feeding of the fibers across the wire face of the doffer roll 24 is important so that each needle 14 will pick or rake from the doffer roll a uniform amount or bundle of fibers which become the pile of the knit pile fabric. Unless the needles rake substantially uniform amounts or bundles of fibers from the doffer roll, the pile of the knit pile fabric will not be uniform and smooth. Uniform distribution of the pile throughout the fabric is important from the standpoint of the desired appearance of the pile fabric.

I claim:

1. A carding head for a knitting machine having a set of needles, said carding head being operative to convert sliver in rope form and composed of discrete fibers into an attenuated, flattened and widened sheet suitable for reception by the needles to knit a pile fabric comprising, in combination with a transfer roll and doffer:

(a) a plurality of successive pairs of spaced feed rolls, driven at progressively increasing rates of speed, for feeding sliver to the transfer roll, (b) a support for the feed rolls, including means to adjust the feed rolls as a unit toward and away from the transfer roll, (c) adjusting means on the support for selectively adjusting the spaced pairs of feed rolls relatively toward or away from each other, (d) a rotary brush mounted on the support and disposed in touching relationship to both the last successive pair of feed rolls and the transfer roll and (e) adjustment means on the support to position the brush in touching relationship to the last successive pair of feed rolls and the transfer roll regardless of the position of the support relative to the transfer roll.

2. The carding head of claim 1 further including adjustable guide means in advance of the feed rolls through which the sliver passes from a source of supply to the first pair of feed rolls.

3. A carding head for a knitting machine having a set of needles, said carding head being operative to convert sliver in rope form and composed of discrete fibers into an attenuated, flattened and widened sheet suitable for reception by the needles to knit a pile fabric comprising, in combination with a transfer roll and doffer:

(a) a plurality of successive pairs of peripherally fluted feed rolls driven at progressively increasing rates of speed for feeding sliver to the transfer roll, (b) each successive pair of rolls being spaced from the preceding pair of rolls a distance greater than the length of the major portion of the fibers, (c) the fluted periphery of each roll being composed of generally V-shaped crests and valleys in alternation, (d) the converging side faces of the generally V-shaped valleys forming an angle in the range from 60° to 90°, (e) resilient means yieldably urging each pair of rolls into flute meshing engagement at selected pressures, (f) a rotary brush disposed in touching relationship to both the last successive pair of feed rolls and to the transfer roll and (g) adjustment means operative to position the brush at all times in touching relationship to the last successive pair of feed rolls and the transfer roll.

*4. A carding head for a knitting machine having a set of needles, said carding head being operative to convert sliver in rope form and composed of discrete fibers into an attenuated, flattened and widened sheet suitable for reception by the needles to knit a pile fabric comprising, in combination with a transfer roll and doffer:*

*(a) a plurality of successive pairs of spaced feed rolls, driven at progressively increasing rates of speed, for feeding sliver to the transfer roll,*

*(b) a support for the feed rolls, including means to adjust the feed rolls as a unit toward and away from the transfer roll,*

*(c) adjusting means on the support for selectively adjusting the spaced pairs of feed rolls relatively toward or away from each other,*

*(d) a rotary brush mounted on the support and disposed in touching relationship to the transfer roll and*

*(e) adjustment means on the support to position the brush in touching relationship at all times to the transfer roll regardless of the position of the support relative to the transfer roll.*

*5. A carding head for a knitting machine having a set of needles, said carding head being operative to convert sliver in rope form and composed of discrete fibers into an attenuated, flattened and widened sheet suitable for reception by the needles to knit a pile fabric comprising, in combination with a transfer roll and doffer:*

*(a) a plurality of successive pairs of peripherally fluted feed rolls driven at progressively increasing rates of speed for feeding sliver to the transfer roll,*

*(b) each successive pair of rolls being spaced from the preceding pair of rolls a distance greater than the length of the major portion of the fibers,*

*(c) the fluted periphery of each roll being composed of generally V-shaped crests and valleys in alternation,*

*(d) the converging side faces of the generally V-shaped valleys forming an angle in the range from 60 to 90°,*

*(e) resilient means yieldably urging each pair of rolls into flute meshing engagement at selected pressures,*

(*f*) *a rotary brush disposed in touching relationship to the transfer roll and*

(*g*) *adjustment means operative to position the brush at all times in touching relationship to the transfer roll.*

References Cited by the Examiner

The following references cited by the Examiner, are of record in the patented file of this patent or the original patent.

UNITED STATES PATENTS

| | | | |
|---|---|---|---|
| 139,609 | 6/1873 | Proctor | 19—99 |
| 318,121 | 5/1885 | Klein | 19—105 |
| 534,418 | 2/1895 | Bates | 19—160 |
| 632,947 | 9/1899 | Rand | 19—282 X |
| 731,409 | 6/1903 | Shackleton | 57—36 |
| 864,515 | 8/1907 | Collins | 19—105 |

| | | | |
|---|---|---|---|
| 1,702,641 | 2/1929 | Butler | 19—292 X |
| 2,412,357 | 12/1946 | Robinson | 19—282 |
| 2,710,525 | 6/1955 | Brandt | 66—9 |
| 2,728,111 | 12/1955 | Werth et al. | 19—260 |
| 2,738,555 | 3/1956 | Whitehurst | 19—282 |
| 2,953,823 | 9/1960 | Lynch | 19—157 |
| 3,010,297 | 11/1961 | Hill | 66—9 |
| 3,019,623 | 2/1962 | Howes | 66—9 |
| 3,021,698 | 2/1962 | Hill | 66—9 |
| 3,095,614 | 7/1963 | Moore | 66—9 X |

FOREIGN PATENTS

| | | |
|---|---|---|
| 3,183 | 1882 | Great Britain. |
| 3,881 | 1883 | Great Britain. |
| 274,180 | 7/1927 | Great Britain. |

ROBERT R. MACKEY, *Primary Examiner.*